Figure 1:
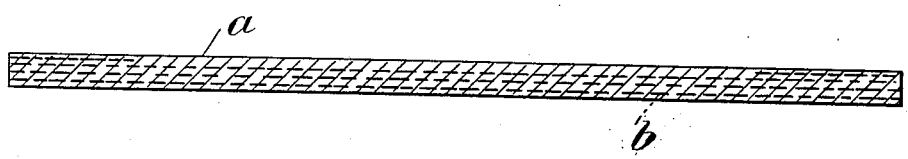

No. 885,955. PATENTED APR. 28, 1908.
F. REDDAWAY.
MANUFACTURE OF CONVEYER BELTING AND MACHINE BELTING.
APPLICATION FILED SEPT. 27, 1907.

UNITED STATES PATENT OFFICE.

FRANK REDDAWAY, OF PENDLETON, MANCHESTER, ENGLAND.

MANUFACTURE OF CONVEYER-BELTING AND MACHINE-BELTING.

No. 885,955.            Specification of Letters Patent.          Patented April 28, 1908.

Application filed September 27, 1907. Serial No. 394,918.

*To all whom it may concern:*

Be it known that I, FRANK REDDAWAY, a subject of Great Britain, residing at Cheltenham street, Pendleton, Manchester, in the county of Lancaster, England, manufacturer, have invented new and useful Improvements in the Manufacture of Conveyer-Belting and Machine-Belting, of which the following is a specification.

My invention has reference to conveyer belting which is employed, as is well known, in transporting minerals, grain and the like, and also to woven driving and machinery belting generally.

Conveyer belting of the kind to which my invention relates usually consists of rubber fortified by insertions or layers of cotton canvas duck. Prior to my invention such cotton canvas has been woven from a warp and weft of single twisted fibers.

It is found in practice that conveyer belts in which such cotton canvas insertions are used are too liable to stretch owing no doubt, to the elasticity of the fibers from which the cotton canvas is woven. I have devised means to overcome such defect and to this end the essential novel feature of my invention consists in the employment of cotton canvas insertions or layers which are woven, both in warp and weft, of "cabled yarns" or I might use cabled yarns for warp only, and single twist for weft. As is well known cabled yarns are composed of several strands, each of such strands being made up of several twisted fibers. The several strands of twisted fibers are then twisted into a cabled yarn. Such cabled yarns have a very slight degree of elasticity as compared with the single twisted ones and consequently the canvas woven therefrom, when used as insertions in the conveyer belt, insures the production of a belt in which the objectionable tendency to stretching is removed, and further increases the strength of the belt. The layers of cotton canvas woven from such cabled yarns may be of any desired number according to the size and strength of the conveyer belt. Also such layers may be incorporated with the rubber body of the belt or made up to form a conveyer belt in any usual or suitable manner.

In applying my invention in the manufacture of driving and other machinery belting I use any suitable number of cotton canvas layers, woven from cabled yarns as above described. Such layers vary in number and width according to the size and strength of belt required and are cemented or secured together to the requisite thickness in the usual way. The belt may then be finished either with protective coats of paint, or other composition, or be covered with an envelop of rubber as desired. I thus also produce by means of my invention driving and other machinery belting of increased strength and diminished elasticity or liability to stretch.

Figure 2:
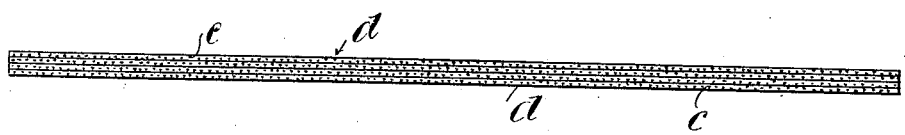

The invention is illustrated in the accompanying drawing in which:

Figure 1 represents in cross section a rubber conveyer belt. Fig. 2 is a similar section of driving belting.

In Fig. 1 the body of the belt marked *a* is of rubber and is fortified by insertions of canvas *b* represented by dotted lines. These canvas insertions, under my invention, are woven wholly or partly of cabled yarns as described above. "Cabled" yarn is prepared as follows: First, a thread is spun; second, several threads are twisted into a strand; and third, several strands are twisted into what is called "cabled" yarn. In manufacturing driving belting the belt is made of any desired number of cloths of cabled yarn or partly of cabled yarn, the warp threads being represented by the dots *c* and the weft by *d*. The various cloths are secured together either in the process of weaving or by sticking or other suitable means.

I declare that what I claim is.

1. A belt composed of cotton canvas duck, woven wholly or partly from cabled yarns, for reducing the tendency of the belt to stretch.

2. Conveyer belting composed of cotton canvas duck, woven wholly or partly from cabled yarns cemented together in layers and having a protective surface as rubber or other composition.

In testimony whereof I have signed my name to this specification in the presence of two subscribing witnesses.

FRANK REDDAWAY.

Witnesses:
     F. E. BRADLEY,
     WALTER PEPPERDINE.